United States Patent
Zheng

(10) Patent No.: US 10,506,485 B2
(45) Date of Patent: Dec. 10, 2019

(54) VOICE SWITCHING METHOD AND APPARATUS

(71) Applicant: Huawei Technologies Co., Ltd., Shenzhen (CN)

(72) Inventor: Shunli Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 15/616,691

(22) Filed: Jun. 7, 2017

(65) Prior Publication Data

US 2017/0272994 A1    Sep. 21, 2017

Related U.S. Application Data

(63) Continuation of application No. PCT/CN2015/096560, filed on Dec. 7, 2015.

(30) Foreign Application Priority Data

Dec. 8, 2014    (CN) .......................... 2014 1 0745218

(51) Int. Cl.
*H04W 36/14*    (2009.01)
*H04W 36/00*    (2009.01)
(Continued)

(52) U.S. Cl.
CPC ......... *H04W 36/14* (2013.01); *H04L 65/1016* (2013.01); *H04W 36/0022* (2013.01); *H04W 36/0072* (2013.01); *H04W 88/08* (2013.01)

(58) Field of Classification Search
CPC . H04W 36/14; H04W 36/0072; H04W 88/08; H04L 65/1016
See application file for complete search history.

(56) References Cited

U.S. PATENT DOCUMENTS

2007/0253372 A1*  11/2007  Nakayasu ............. H04W 36/30
                                                            370/331
2008/0032686 A1*  2/2008  Xu ........................ H04M 15/00
                                                            455/422.1
(Continued)

FOREIGN PATENT DOCUMENTS

CN    102647693 A    8/2012
CN    103004261 A    3/2013
(Continued)

OTHER PUBLICATIONS

Sherif et al.,"Voice Evolution in 4G Networks", XP055236584, pp. 445-506, John Wiley and Sons.Ltd (Apr. 15, 2014).
(Continued)

*Primary Examiner* — Jamal Javaid
*Assistant Examiner* — Thad N Defauw
(74) *Attorney, Agent, or Firm* — Leydig, Voit & Mayer, Ltd.

(57) ABSTRACT

Embodiments disclose a voice switching method and apparatus. The method includes: receiving a voice switching request that is sent by a source mobility management entity (MME) and that carries a first communications network currently used by a to-be-switched terminal, a terminal identifier of the terminal, and a target base station identifier; if the first communications network is a preset communications network, sending, to an Internet Protocol multimedia subsystem (IMS), a query request that is used to query whether the terminal currently has a voice switching capability from the first communications network to a locally used second communications network, where the query request carries the terminal identifier; and performing voice switching processing according to the target base station identifier and the terminal identifier if a notification message
(Continued)

that is sent by the IMS and that indicates that the terminal has the voice switching capability is received.

20 Claims, 3 Drawing Sheets

(51) Int. Cl.
*H04L 29/06* (2006.01)
*H04W 88/08* (2009.01)

(56) References Cited

U.S. PATENT DOCUMENTS

| | | | | |
|---|---|---|---|---|
| 2009/0117906 | A1* | 5/2009 | Thomas | H04W 36/0066 455/439 |
| 2012/0040662 | A1 | 2/2012 | Rahman et al. | |
| 2013/0070655 | A1 | 3/2013 | Nishida et al. | |
| 2014/0099954 | A1 | 4/2014 | Choi et al. | |
| 2014/0219241 | A1* | 8/2014 | Parron | H04W 36/0022 370/331 |
| 2015/0024751 | A1* | 1/2015 | Wong | H04W 36/0022 455/436 |
| 2015/0195762 | A1 | 7/2015 | Watanabe et al. | |
| 2015/0382251 | A1* | 12/2015 | Wang | H04W 36/0022 455/439 |

FOREIGN PATENT DOCUMENTS

| | | |
|---|---|---|
| CN | 103200626 A | 7/2013 |
| CN | 103379557 A | 10/2013 |
| CN | 103609168 A | 2/2014 |
| CN | 104170455 A | 11/2014 |
| CN | 104507133 A | 4/2015 |
| EP | 2579647 A1 | 4/2013 |
| KR | 20140045887 A | 4/2014 |
| WO | 2013104651 A1 | 7/2013 |
| WO | 2014002320 A1 | 1/2014 |
| WO | 2014057691 A1 | 4/2014 |

OTHER PUBLICATIONS

Poikselka et al.,"VoLTE End to End and Signalling", XP055082307, pp. 99-215, John Wiley and Sons.Ltd (Feb. 1, 2012).

Kosui et al,"Inter-domain Handover Applying Technology of Voice in LTE (VoLTE) and TV Telephony," NTT DOCOMO Technical Journal, pp. 51-60 (Jan. 1, 2012).

"3rd Generation Partnership Project;Technical Specification Group Services and System Aspects;Single Radio Voice Call Continuity (SRVCC);Stage 2(Release 12)," 3GPP TS 23.216 V12.1.0 (Jun. 2014), pp. 1-69, 3rd Generation Partnership Project—Valbonne, France (Jun. 2014).

"3rd Generation Partnership Project; Technical Specification Group Services and System Aspects; Single Radio Voice Call Continuity (SRVCC); Stage 2 (Release 12)," 3GPP TS 23.216 V12.2.0, pp. 1-69, 3rd Generation Partnership Project, Valbonne, France (Dec. 2014).

"3rd Generation Partnership Project; Technical Specification Group Services and System Aspects; IP Multimedia Subsystem (IMS) Service Continuity; Stage 2 (Release 12)," 3GPP TS 23.237 V12.8.0, pp. 1-172, 3rd Generation Partnership Project, Valbonne, France (Dec. 2014).

"3rd Generation Partnership Project; Technical Specification Group Core Network and Terminals; IP Multimedia (IM) Core Network (CN) subsystem IP Multimedia Subsystem (IMS) Service Continuity; Stage 3 (Release 12)," 3GPP TS 24.237 V12.6.0, 3rd Generation Partnership Project, Valbonne, France (Sep. 2014).

"3rd Generation Partnership Project; Technical Specification Group GSM/EDGE Radio Access Network; Mobile Switching Centre—Base Station System (MSC-BSS) interface; Layer 3 Specification (Release 12)," 3GPP TS 48.008 V12.0.0, pp. 1-227, 3rd Generation Partnership Project, Valbonne, France (Sep. 2014).

"SRVCC before 180 ringing (bSRVCC)," 3GPP TSG-CT WG1#82 C1-130348, 3rd Generation Partnership Project, Valbonne, France (Jan. 28-Feb. 1, 2013).

"ECSFB evaluation," 3GPP TSG-SA WG2#106 S2-144002, 3rd Generation Partnership Project, Valbonne, France (Nov. 17-21, 2014).

* cited by examiner

ND APPARATUS

CROSS-REFERENCE TO RELATED APPLICATIONS

This application is a continuation application of International Application No. PCT/CN2015/096560, filed on Dec. 7, 2015, which claims priority to Chinese Patent Application No. 201410745218.X, filed on Dec. 8, 2014. The disclosures of the aforementioned applications are hereby incorporated by reference in their entireties.

TECHNICAL FIELD

The present disclosure relates to the field of communications technologies, and in particular, to a voice switching method and apparatus.

BACKGROUND

Communications technologies have developed continuously, especially wireless communications technologies, which has developed from an original first generation mobile communications technology (1G) and a second generation mobile communications technology (2G) to a current third generation mobile communications technology (3G) and a fourth generation mobile communications technology (4G). Because the fourth generation mobile communications technology is still in a debugging and trial stage, coverage of a 4G network is relatively small. When a call is made/answered by using the 4G network, if the 4G network that is used is relatively poor, the voice call on the 4G network may be switched to a 2G or 3G network.

In a process of switching the voice call on the 4G network to the 2G or 3G network, a terminal detects channel quality of a channel that is being used by the terminal and channel quality of a channel in a surrounding neighboring cell, and sends the channel quality of the channel that is being used by the terminal and the channel quality of the channel in the surrounding neighboring cell to a source base station. The source base station selects one channel according to the channel quality of the channels, obtains a wireless identifier of the channel, and sends, to a source MME (mobility management entity), a switching request that carries the wireless identifier. The source MME sends a voice switching request to a corresponding target MSC (mobile switching center), and the target MSC performs voice switching processing after receiving the voice switching request, that is, the target MSC sends a resource allocation request to a corresponding target base station. When the target base station receives the resource allocation request, the target base station starts to prepare a corresponding resource for current switching, and sends a resource preparation complete notification message to the target MSC after the preparation is completed. The target MSC sends, to an IMS (Internet Protocol multimedia subsystem), a switching instruction that carries a terminal identifier. The IMS queries whether information about a voice capability of the terminal matches current-call-state information. If the information about the voice capability of the terminal matches the current-call-state information, the IMS executes a voice switching program, and at the same time, the target MSC instructs to hand over the terminal to the target base station; if the information about the voice capability of the terminal does not match the current-call-state information, the target MSC sends a switching failure notification message to the source base station.

In a process of implementing the present disclosure, the inventor finds that the prior art has at least the following problem:

In a process of switching a voice call on a 4G network to a 2G or 3G network in the foregoing manner, after a source MME sends a voice switching request to a target MSC, the target MSC needs to instruct a target base station to prepare a corresponding resource; a process of initiating voice switching by an IMS is started only after the resource is prepared; when the IMS determines that information about a possessed voice capability does not match current-call-state information, the target base station has reserved, for a relatively long time (which may reach 15 seconds), the resource prepared for current switching, thereby causing a resource waste.

SUMMARY

To resolve a problem in the prior art, embodiments of the present disclosure provide a voice switching method and apparatus. A technical solution is as follows:

According to a first aspect, a voice switching method is provided, where the method includes:

receiving a voice switching request that is sent by a source mobility management entity MME and that carries a first communications network currently used by a to-be-switched terminal, a terminal identifier of the terminal, and a target base station identifier;

if the first communications network is a preset communications network, sending, to an Internet Protocol multimedia subsystem IMS, a query request that is used to query whether the terminal currently has a voice switching capability from the first communications network to a locally used second communications network, where the query request carries the terminal identifier; and performing voice switching processing according to the target base station identifier and the terminal identifier if a notification message that is sent by the IMS and that indicates that the terminal has the voice switching capability is received; or sending a switching failure notification message to the source MME if a notification message that is sent by the IMS and that indicates that the terminal does not have the voice switching capability is received.

With reference to the first aspect, in a first possible implementation manner of the first aspect, the notification message that indicates that the terminal has the voice switching capability carries current-call-state information;

the performing voice switching processing according to the target base station identifier and the terminal identifier if a notification message that is sent by the IMS and that indicates that the terminal has the voice switching capability is received includes:

if the notification message that is sent by the IMS and that indicates that the terminal has the voice switching capability is received, determining, according to the current-call-state information and a locally stored correspondence between call state information of the terminal and a voice switching capability of the terminal, whether the terminal has the voice switching capability in a current call state; and if the terminal has the voice switching capability in the current call state, performing voice switching processing according to the target base station identifier and the terminal identifier; and the method further includes:

sending the switching failure notification message to the source MME if it is determined, according to the current-call-state information and the locally stored correspondence between call state information of the terminal and a voice switching capability of the terminal, that the terminal does not have the voice switching capability in the current call state.

With reference to the first aspect, in a second possible implementation manner of the first aspect, the performing voice switching processing according to the target base station identifier and the terminal identifier if a notification message that is sent by the IMS and that indicates that the terminal has the voice switching capability is received includes:

if the notification message that is sent by the IMS and that indicates that the terminal has the voice switching capability is received, obtaining resource usage of a target base station corresponding to the target base station identifier, and performing voice switching processing according to the target base station identifier and the terminal identifier if the resource usage is less than a preset resource usage threshold.

With reference to the first aspect, in a third possible implementation manner of the first aspect, after the performing voice switching processing according to the target base station identifier and the terminal identifier if a notification message that is sent by the IMS and that indicates that the terminal has the voice switching capability is received, the method further includes:

if a voice switching failure notification message sent by the IMS is received, sending a resource release request to a target base station corresponding to the target base station identifier, suspending a network resource of the first communications network currently used by the terminal and a current call state of the terminal, and when a voice switching cancellation notification message sent by the source MME is received, canceling voice switching of the terminal from the first communications network to the second communications network.

With reference to the first aspect, in a fourth possible implementation manner of the first aspect, the notification message that indicates that the terminal has the voice switching capability carries current-call-state information;

the performing voice switching processing according to the target base station identifier and the terminal identifier if a notification message that is sent by the IMS and that indicates that the terminal has the voice switching capability is received includes:

performing voice switching processing according to the target base station identifier and the terminal identifier if the notification message that is sent by the IMS and that indicates that the terminal has the voice switching capability is received and voice switching of the terminal from the first communications network to the second communications network in a call state corresponding to the current-call-state information is locally supported; and the method further includes:

sending a voice switching failure notification message to the source MME if the voice switching of the terminal from the first communications network to the second communications network in the call state corresponding to the current-call-state information is not locally supported.

According to a second aspect, a voice switching apparatus is provided, where the apparatus includes:

a receiving module, configured to receive a voice switching request that is sent by a source mobility management entity MME and that carries a first communications network currently used by a to-be-switched terminal, a terminal identifier of the terminal, and a target base station identifier;

a sending module, configured to: if the first communications network is a preset communications network, send, to an Internet Protocol multimedia subsystem IMS, a query request that is used to query whether the terminal currently has a voice switching capability from the first communications network to a locally used second communications network, where the query request carries the terminal identifier; and a processing module, configured to: perform voice switching processing according to the target base station identifier and the terminal identifier if a notification message that is sent by the IMS and that indicates that the terminal has the voice switching capability is received; or send a switching failure notification message to the source MME if a notification message that is sent by the IMS and that indicates that the terminal does not have the voice switching capability is received.

With reference to the second aspect, in a first possible implementation manner of the second aspect, the notification message that indicates that the terminal has the voice switching capability carries current-call-state information;

the processing module is configured to:

if the notification message that is sent by the IMS and that indicates that the terminal has the voice switching capability is received, determine, according to the current-call-state information and a locally stored correspondence between call state information of the terminal and a voice switching capability of the terminal, whether the terminal has the voice switching capability in a current call state; and if the terminal has the voice switching capability in the current call state, perform voice switching processing according to the target base station identifier and the terminal identifier; and the sending module is configured to:

send the switching failure notification message to the source MME if it is determined, according to the current-call-state information and the locally stored correspondence between call state information of the terminal and a voice switching capability of the terminal, that the terminal does not have the voice switching capability in the current call state.

With reference to the second aspect, in a second possible implementation manner of the second aspect, the processing module is configured to:

if the notification message that is sent by the IMS and that indicates that the terminal has the voice switching capability is received, obtain resource usage of a target base station corresponding to the target base station identifier, and perform voice switching processing according to the target base station identifier and the terminal identifier if the resource usage is less than a preset resource usage threshold.

With reference to the second aspect, in a third possible implementation manner of the second aspect, the apparatus further includes a canceling module, configured to:

if a voice switching failure notification message sent by the IMS is received, send a resource release request to a target base station corresponding to the target base station identifier, suspend a network resource of the first communications network currently used by the terminal and a current call state of the terminal, and when a voice switching cancellation notification message sent by the source MME is received, cancel voice switching of the terminal from the first communications network to the second communications network.

With reference to the second aspect, in a fourth possible implementation manner of the second aspect, the notification message that indicates that the terminal has the voice switching capability carries current-call-state information;

the processing module is configured to:

perform voice switching processing according to the target base station identifier and the terminal identifier if the notification message that is sent by the IMS and that indicates that the terminal has the voice switching capability is received and voice switching of the terminal from the first communications network to the second communications network in a call state corresponding to the current-call-state information is locally supported; and the sending module is configured to:

send a voice switching failure notification message to the source MME if the voice switching of the terminal from the first communications network to the second communications network in the call state corresponding to the current-call-state information is not locally supported.

The technical solution provided in the embodiments of the present disclosure brings the following beneficial effect:

In the embodiments of the present disclosure, a voice switching request that is sent by a source mobility management entity MME and that carries a first communications network currently used by a to-be-switched terminal, a terminal identifier of the terminal, and a target base station identifier is received; if the first communications network is a preset communications network, a query request that is used to query whether the terminal currently has a voice switching capability from the first communications network to a locally used second communications network is sent to an Internet Protocol multimedia subsystem IMS, where the query request carries the terminal identifier; and voice switching processing is performed according to the target base station identifier and the terminal identifier if a notification message that is sent by the IMS and that indicates that the terminal has the voice switching capability is received; or a switching failure notification message is sent to the source MME if a notification message that is sent by the IMS and that indicates that the terminal does not have the voice switching capability is received. In this way, whether the terminal has a corresponding voice switching capability may be determined before a resource for performing voice switching is prepared for the terminal, and the corresponding resource is prepared for the terminal only after it is determined that the terminal has the corresponding voice switching capability, so that a resource waste can be reduced.

DESCRIPTION OF EMBODIMENTS

To make the objectives, technical solutions, and advantages of the present disclosure clearer, the following further describes the embodiments of the present disclosure in detail with reference to the accompanying drawings.

Embodiment 1

Figure 1:
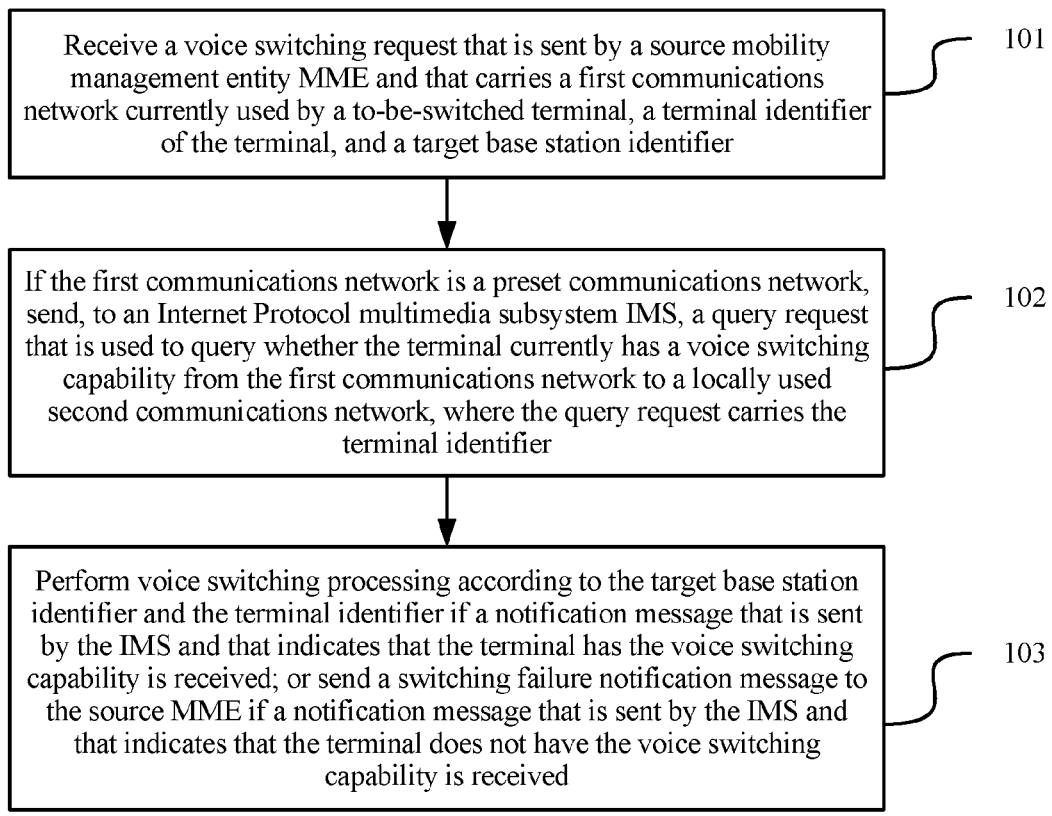
FIG. 1 is a flowchart of a voice switching method according to an embodiment of the present disclosure.

This embodiment of the present disclosure provides a voice switching method. As shown in FIG. 1, a processing procedure of the method may include the following steps:

Step 101: Receive a voice switching request that is sent by a source mobility management entity MME and that carries a first communications network currently used by a to-be-switched terminal, a terminal identifier of the terminal, and a target base station identifier.

Step 102: If the first communications network is a preset communications network, send, to an Internet Protocol multimedia subsystem IMS, a query request that is used to query whether the terminal currently has a voice switching capability from the first communications network to a locally used second communications network, where the query request carries the terminal identifier.

Step 103: Perform voice switching processing according to the target base station identifier and the terminal identifier if a notification message that is sent by the IMS and that indicates that the terminal has the voice switching capability is received; or send a switching failure notification message to the source MME if a notification message that is sent by the IMS and that indicates that the terminal does not have the voice switching capability is received.

In this embodiment of the present disclosure, a voice switching request that is sent by a source mobility management entity MME and that carries a first communications network currently used by a to-be-switched terminal, a terminal identifier of the terminal, and a target base station identifier is received; if the first communications network is a preset communications network, a query request that is used to query whether the terminal currently has a voice switching capability from the first communications network to a locally used second communications network is sent to an Internet Protocol multimedia subsystem IMS, where the query request carries the terminal identifier; and voice switching processing is performed according to the target base station identifier and the terminal identifier if a notification message that is sent by the IMS and that indicates that the terminal has the voice switching capability is received; or a switching failure notification message is sent to the source MME if a notification message that is sent by the IMS and that indicates that the terminal does not have the voice switching capability is received. In this way, whether the terminal has a corresponding voice switching capability may be determined before a resource for performing voice switching is prepared for the terminal, and the corresponding resource is prepared for the terminal only after it is determined that the terminal has the corresponding voice switching capability, so that a resource waste can be reduced.

Embodiment 2

This embodiment of the present disclosure provides a voice switching method, where the method is performed by a target MSC. The target MSC may include one communications network device (such as a server), or may include two communications network devices with different functions. In this embodiment of the present disclosure, a target MSC including one communications network device is used as an example to describe a solution in detail. Another case is similar to this case, and details are not described herein.

The following describes a processing procedure shown in FIG. 1 in detail with reference to specific implementation manners, and content may be as follows.

Step 101: Receive a voice switching request that is sent by a source mobility management entity MME and that carries a first communications network currently used by a to-be-switched terminal, a terminal identifier of the terminal, and a target base station identifier.

A communications network may include multiple types, such as a 2G network, a 3G network, and a 4G network. The first communications network may be one type of communications network of the foregoing multiple types of communications networks. The terminal may be any terminal that has a wireless communications function, such as a mobile phone. The terminal identifier may be an IMEI (International Mobile Equipment Identity) of the terminal, or may be a communications number (such as a mobile phone number) or the like of the terminal. The base station identifier may be a serial number, a name, or the like of a base station.

In implementation, a user may enter, to a terminal used by the user, a terminal identifier of another terminal to which the user needs to make a voice call, such as a mobile phone number, and may press a dialing key after completing the entering. The terminal obtains the terminal identifier entered by the user and a terminal identifier of the terminal, generates a voice communication request, and sends the voice communication request to a base station (that is, a source base station) to which the terminal belongs. The source base station may send the voice communication request to an EPC (Evolved Packet Core) to which the source base station belongs, and therefore, the voice communication request is sent to an IMS. After receiving the voice communication request, the IMS may extract the terminal identifier entered by the user from the voice communication request, query an identifier of another device that is in a core network and that is corresponding to the terminal identifier, and may send the received voice communication request to the device corresponding to the foregoing queried identifier. In the foregoing manner, the voice communication request is forwarded successively until the another terminal receives the voice communication request, thereby establishing voice communication between the terminal and the another terminal.

The to-be-switched terminal may measure channel quality of a neighboring channel at a location of the terminal in some manners, detect channel quality of the communications network that is currently used by the terminal, generate a measurement message by using related information of the foregoing neighboring channel, and send the measurement message to the source base station. If the source base station determines that the channel quality of the first communications network currently used by the terminal is less than a preset first channel quality threshold, the source base station may analyze the received related information of the neighboring channel, select one neighboring channel whose channel quality is greater than a second channel quality threshold, and obtain related information of the selected neighboring channel, such as related information of a cell in which the neighboring channel is located, such as a cell identifier. The source base station may generate a voice switching request by using the related information of the neighboring channel and the terminal identifier of the terminal, and send the voice switching request to an MME (that is, the source MME) to which the source base station belongs. The source MME may obtain a corresponding MSC identifier (that is, a destination MSC identifier), the communications network (that is, the first communications network) currently used by the terminal, the target base station identifier, and the like from the related information of the neighboring channel, and determine whether voice switching needs to be performed. If voice switching needs to be performed, the foregoing information may be set in the foregoing voice switching request and sent to a target MSC corresponding to the destination MSC identifier.

It should be noted that the foregoing destination MSC may include two parts. For example, the target MSC may include an MSC server and an MSC processing component. For a process and a manner of processing data by the two parts, reference may be made to content of an existing processing process and an existing processing manner, and details are not described herein.

Step 102: If the first communications network is a preset communications network, send, to an Internet Protocol multimedia subsystem IMS, a query request that is used to query whether the terminal currently has a voice switching capability from the first communications network to a locally used second communications network, where the query request carries the terminal identifier.

The first communications network may be different from the second communications network. For example, the first communications network may be a 4G network, and the second communications network may be any communications network except the 4G network, such as a 2G network. The voice switching capability may include voice switching before ringing, voice switching during ringing, voice switching of a multi-channel call, and the like.

In implementation, the preset communications network may be a 4G network. After receiving the voice switching request, the target MSC extracts information about the first communications network from the voice switching request, such as a network identifier of the first communications network or information about a communications protocol used by the first communications network, determines a network type of the first communications network by using the information, and then compares the first communications network with the preset communications network (which may be a 4G network). If the first communications network is not a 4G network, the target MSC may perform corresponding processing by using an existing voice switching processing procedure. If the first communications network is a 4G network, and the second communications network used by the target MSC is a 2G network, the target MSC may determine whether the to-be-switched terminal currently has a voice switching capability from the 4G network to the 2G network. Specifically, the target MSC may determine, in a manner of querying the IMS, whether the terminal has the foregoing voice switching capability, that is, the target MSC sends a query request to an IMS to which the target MSC belongs, where the query request is used to query whether the terminal currently has the voice switching capability from the 4G network to the locally used 2G network.

Step 103: Perform voice switching processing according to the target base station identifier and the terminal identifier if a notification message that is sent by the IMS and that indicates that the terminal has the voice switching capability is received; or send a switching failure notification message to the source MME if a notification message that is sent by the IMS and that indicates that the terminal does not have the voice switching capability is received.

In implementation, when a first terminal (which may be any terminal) sends a voice communication request to a second terminal (another terminal than the first terminal), the first terminal sends a voice switching capability of the first terminal to the IMS by using the source base station, an EPC, and the like. The IMS may store a terminal identifier of the first terminal and the voice switching capability of the first terminal in a corresponding manner. When receiving the foregoing query request, the IMS may determine the corresponding voice switching capability in the foregoing correspondence by using the terminal identifier carried in the query request. The IMS may store current-call-state information of the terminal, such as pre-ringing, during ringing, or a multi-channel call. The IMS may find current-call-state information of the corresponding terminal by using the terminal identifier carried in the query request. Then, the IMS may match and compare the current-call-state information with the voice switching capability of the terminal; and if the current-call-state information matches the voice switching capability of the terminal, the IMS may send, to the target MSC, the notification message that indicates that the terminal has the voice switching capability. After receiving the notification message, the target MSC may perform voice switching processing according to the target base station identifier and the terminal identifier, that is, the target MSC may send a resource allocation request to the target base station. The target base station may prepare a corresponding resource for current voice switching when receiving the resource allocation request, and send a resource preparation complete notification message to the target MSC after completing the preparation. The target MSC sends, to the IMS, a voice switching instruction that carries the terminal identifier, the IMS executes a voice switching program, and the target MSC instructs the target base station to perform voice switching, thereby completing a voice switching process.

If the current-call-state information does not match the voice switching capability of the terminal, a notification message that indicates that the terminal does not have the voice switching capability may be sent to the target MSC. The target MSC may send a switching failure notification message to the source MME after receiving the notification message. In this case, the source MME may send the switching failure notification message to the source base station. If the source base station determines again, at a certain moment, that voice switching needs to be performed, the foregoing process may be repeated, so as to complete voice switching from the first communications network to the second communications network.

Optionally, there may be various processing manners for the foregoing step 103. The following provides an optional processing manner, which may specifically include the following content: The notification message that indicates that the terminal has the voice switching capability carries current-call-state information; if the notification message that is sent by the IMS and that indicates that the terminal has the voice switching capability is received, whether the terminal has the voice switching capability in a current call state may be determined according to the current-call-state information and a locally stored correspondence between call state information of the terminal and a voice switching capability of the terminal; and if the terminal has the voice switching capability in the current call state, voice switching processing is performed according to the target base station identifier and the terminal identifier.

In implementation, a certain terminal may have multiple voice switching capabilities, but in an actual voice switching process, a success rate of voice switching may be relatively low. A terminal identifier of a terminal with a low success rate of voice switching may be recorded in the target MSC, and may be specifically stored in the target MSC in a manner of correspondence, for example, establishing the correspondence between call state information of the terminal and a voice switching capability of the terminal. The target MSC may store terminal identifiers of multiple terminals and voice switching capabilities of the terminals that are corresponding to the terminal identifiers. In this way, the target MSC may first perform corresponding processing on the foregoing voice switching process of the terminal according to the locally stored voice switching capabilities, which may be specifically as follows: When the IMS receives the foregoing query request, the IMS may determine, in the foregoing processing manner, that the foregoing to-be-switched terminal has the voice switching capability; the IMS may send, to the target MSC, the notification message that carries the current-call-state information corresponding to the terminal and that indicates that the terminal has the voice switching capability; the target MSC may extract the current-call-state information, and search the foregoing correspondence by using the current-call-state information and the terminal identifier of the terminal, so as to determine whether the to-be-switched terminal has the voice switching capability in the current call state; if the to-be-switched terminal has the voice switching capability in the current call state, voice switching processing is performed according to the target base station identifier and the terminal identifier. For a corresponding processing process, reference may be made to the foregoing content, and details are not described herein.

Correspondingly, the switching failure notification message is sent to the source MME if it is determined, according to the current-call-state information and the locally stored correspondence between call state information of the terminal and a voice switching capability of the terminal, that the terminal does not have the voice switching capability in the current call state.

In implementation, the target MSC may send the switching failure notification message to the source MME if the target MSC determines, by using the current-call-state information, the terminal identifier of the terminal, and the foregoing correspondence, that the terminal does not have the voice switching capability in the current call state. In this case, the source MME may send the switching failure notification message to the source base station. If the source base station determines again, at a certain moment, that voice switching needs to be performed, the foregoing process may be repeated, so as to complete voice switching from the first communications network to the second communications network.

Optionally, there may be various processing manners for performing voice switching processing in the foregoing step 103. The following further provides an optional processing manner, which may specifically include the following content: If the notification message that is sent by the IMS and that indicates that the terminal has the voice switching capability is received, resource usage of the target base station corresponding to the target base station identifier is obtained, and voice switching processing is performed according to the target base station identifier and the terminal identifier if the resource usage is less than a preset resource usage threshold.

In implementation, resource usage of different base stations at different moments may be different. If resource usage of a certain base station is relatively high at a certain moment, a burden on the base station is increased after voice switching is performed, thereby causing voice call quality deterioration. A specific processing process may be as follows: When the IMS receives the foregoing query request, the IMS may determine, in the foregoing processing manner, that the foregoing to-be-switched terminal has the voice switching capability. The IMS may send the notification message that indicates that the terminal has the voice switching capability to the target MSC. When receiving the notification message, the target MSC may extract the target base station identifier carried in the voice switching request. The target MSC may store related information about multiple base stations, such as resource usage of the base stations. Then, the target MSC may search stored information such as the resource usage of the base stations, to obtain the resource usage of the target base station corresponding to the target base station identifier, and may compare the resource usage with the preset resource usage threshold. If the resource usage is less than the foregoing preset resource usage threshold, voice switching processing may be performed according to the target base station identifier and the terminal identifier. For a specific processing process, reference may be made to the foregoing related content, and details are not described herein again.

Optionally, there may be various processing manners for performing voice switching processing in the foregoing step 103. The following further provides an optional processing manner, which may specifically include the following content: The notification message that indicates that the terminal has the voice switching capability carries current-call-state information; and voice switching processing is performed according to the target base station identifier and the terminal identifier if the notification message that is sent by the IMS and that indicates that the terminal has the voice switching capability is received and voice switching of the terminal from the first communications network to the second communications network in a call state corresponding to the current-call-state information is locally supported.

In implementation, the IMS, the target MSC, a target LAI (location area identity), a target RNC (radio network controller) and/or a target BSC (base station controller), or the like may not support voice switching of the terminal. Therefore, when the IMS receives the foregoing query request, the IMS may determine, in the foregoing processing manner, that the foregoing to-be-switched terminal has the voice switching capability. The IMS may send, to the target MSC, the notification message that carries the current-call-state information and that indicates that the terminal has the voice switching capability. For a specific processing process, reference may be made to the foregoing related content. After receiving the notification message, the target MSC may determine whether the foregoing target MSC, the target LAI, and the like support the voice switching of the terminal from the first communications network to the second communications network in the call state corresponding to the current-call-state information, that is, voice switching from a 4G network to a 2G network. If the foregoing target MSC, the target LAI, and the like support the voice switching of the terminal from the first communications network to the second communications network in the call state corresponding to the current-call-state information, voice switching processing is performed according to the target base station identifier and the terminal identifier. For a specific processing process, reference may be made to the foregoing related content, and details are not described herein again.

Correspondingly, a voice switching failure notification message is sent to the source MME if the voice switching of the terminal from the first communications network to the second communications network in the call state corresponding to the current-call-state information is not locally supported.

In implementation, if it is determined, by means of the foregoing determining, that the voice switching of the terminal from the first communications network to the second communications network in the call state corresponding to the current-call-state information is not locally supported, the target MSC may send the voice switching failure notification message to the source MME. In this case, the source MME may send the switching failure notification message to the source base station. If the source base station determines again, at a certain moment, that voice switching needs to be performed, the foregoing process may be repeated, so as to complete voice switching from the first communications network to the second communications network.

Optionally, if the foregoing voice switching fails, a resource prepared by the target base station may be released, and a specific processing process may include the following content: If a voice switching failure notification message sent by the IMS is received, a resource release request is sent to the target base station corresponding to the target base station identifier, a network resource of the first communications network currently used by the terminal and a current call state of the terminal are suspended, and when a voice switching cancellation notification message sent by the source MME is received, voice switching of the terminal from the first communications network to the second communications network is canceled.

In implementation, when the target MSC receives the notification message that is sent by the IMS and that indicates that the terminal has the voice switching capability, the target MSC may send a resource allocation request to the target base station. The target base station may prepare a corresponding resource for current voice switching when receiving the resource allocation request, and send a resource preparation complete notification message to the target MSC after completing the preparation. The target MSC sends, to the IMS, a voice switching instruction that carries the terminal identifier, the IMS executes a voice switching program, and the target MSC instructs the target base station to perform voice switching. If the voice switching fails in the foregoing process for some reasons such as a communications network disconnection, the IMS may send the voice switching failure notification message to the target MSC. After receiving the notification message, the target MSC may send the resource release request to the target base station corresponding to the target base station identifier, and the target base station may release the corresponding resource. In this case, the source base station may reserve the network resource of the first communications network currently used by the to-be-switched terminal and the current call state of the terminal. When the terminal cannot access a target channel, the terminal may return to an original channel by using the foregoing reserved network resource, or the source base station initiates service reestablishment, to reestablish a channel, and the channel is provided to the terminal for use, or service reestablishment is initiated by another base station than the source base station in the first communications network to reestablish a channel, and the channel is provided to the terminal for use. The voice switching cancellation notification message that carries the terminal identifier is sent to the source base station. The source base station may send the notification message to the source MME, and the source MME may forward the notification message to the target MSC. After receiving the notification message, the target MSC may cancel voice switching of the terminal from the first communications network to the second communications network. If the terminal does not return to the original channel in preset duration, the target MSC may cancel voice switching of the terminal from the first communications network to the second communications network, and the source MME may release a corresponding 4G network resource. Alternatively, the foregoing processing process may be as follows: After receiving the notification message, the source MME may wait for the source base station to perform detection or the terminal to actively give up voice switching, so that the source MME may release a corresponding 4G network resource.

It should be noted that the foregoing processing process of matching and comparing the current-call-state information with the voice switching capability of the terminal may be completed by the target MSC instead, which may be specifically as follows: If the first communications network is the preset communications network, the target MSC may send, to the IMS, the query request that is used to query whether the terminal currently has the voice switching capability from the first communications network to the locally used second communications network, where the query request carries the terminal identifier; the IMS may send information such as the current-call-state information and the voice switching capability of the terminal to the target MSC; the target MSC may match and compare the current-call-state information with the voice switching capability of the terminal, so as to determine whether the current-call-state information matches the voice switching capability of the terminal, to complete a subsequent processing process. For a specific processing process, reference may be made to the foregoing related content, and details are not described herein again.

In this embodiment of the present disclosure, a voice switching request that is sent by a source mobility management entity MME and that carries a first communications network currently used by a to-be-switched terminal, a terminal identifier of the terminal, and a target base station identifier is received; if the first communications network is a preset communications network, a query request that is used to query whether the terminal currently has a voice switching capability from the first communications network to a locally used second communications network is sent to an Internet Protocol multimedia subsystem IMS, where the query request carries the terminal identifier; and voice switching processing is performed according to the target base station identifier and the terminal identifier if a notification message that is sent by the IMS and that indicates that the terminal has the voice switching capability is received; or a switching failure notification message is sent to the source MME if a notification message that is sent by the IMS and that indicates that the terminal does not have the voice switching capability is received. In this way, whether the terminal has a corresponding voice switching capability may be determined before a resource for performing voice switching is prepared for the terminal, and the corresponding resource is prepared for the terminal only after it is determined that the terminal has the corresponding voice switching capability, so that a resource waste can be reduced.

Embodiment 3

Figure 2:
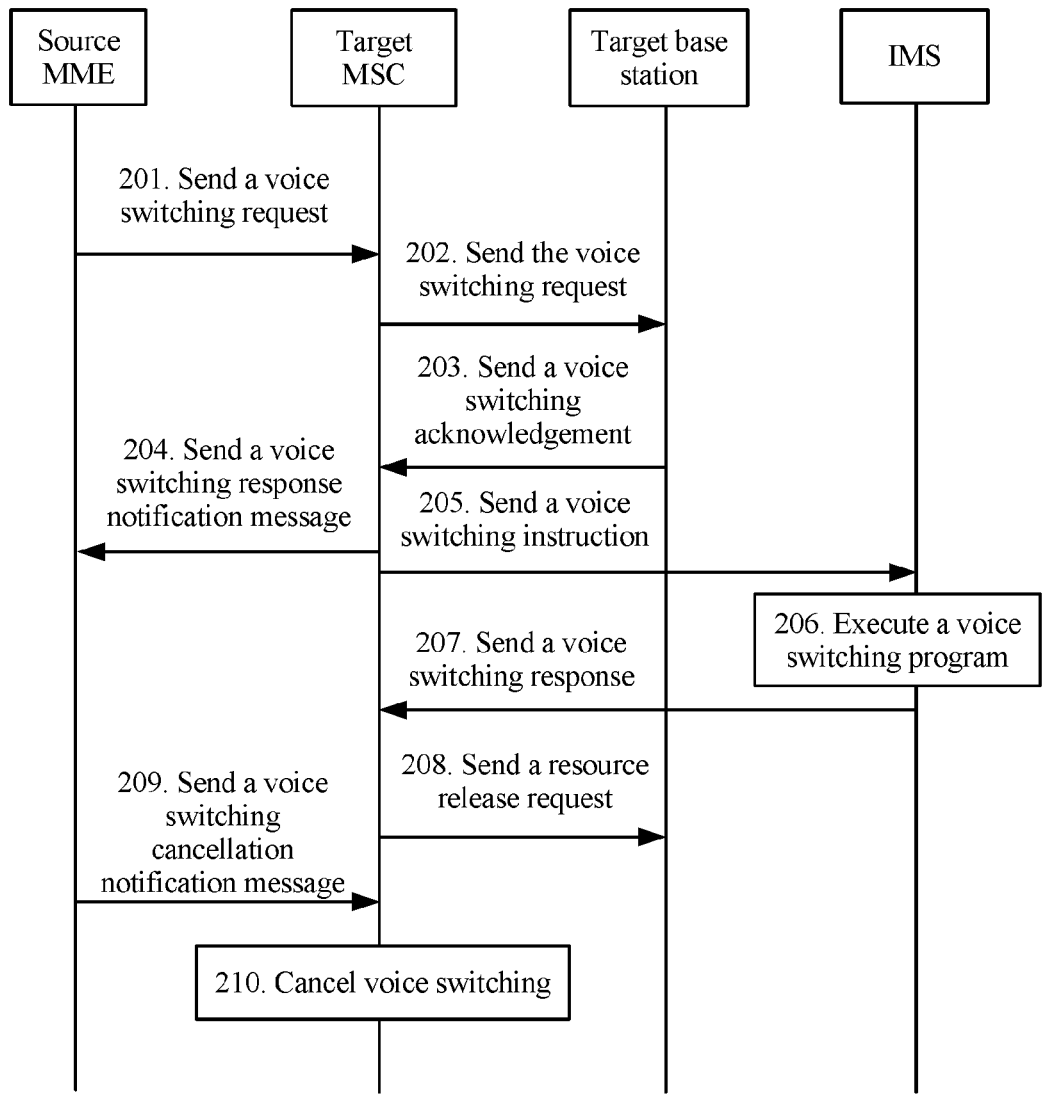
FIG. 2 is a flowchart of a method for canceling voice switching according to an embodiment of the present disclosure.

The following describes in detail a process of canceling voice switching of a terminal from a first communications network to a second communications network in an embodiment of the present disclosure with reference to a specific application scenario. As shown in FIG. 2, the process may include following processing steps:

Step 201: A source MME sends a voice switching request to a target MSC.

Step 202: The target MSC sends the voice switching request to a target base station.

Step 203: The target base station sends a voice switching acknowledgment to the target MSC.

Step 204: An IMS sends a voice switching response notification message to the target MSC.

Step 205: The target MSC sends a voice switching instruction to the IMS.

Step 206: The IMS executes a voice switching program.

Step 207: The target MSC sends a voice switching response to the source MME.

Step 208: The target MSC sends a resource release request to the target base station.

Step 209: The source MME sends a voice switching cancellation notification message to the target MSC.

Step 210: The target MSC cancels voice switching of a terminal from a first communications network to a second communications network.

In this embodiment of the present disclosure, a voice switching request that is sent by a source mobility management entity MME and that carries a first communications network currently used by a to-be-switched terminal, a terminal identifier of the terminal, and a target base station identifier is received; if the first communications network is a preset communications network, a query request that is used to query whether the terminal currently has a voice switching capability from the first communications network to a locally used second communications network is sent to an Internet Protocol multimedia subsystem IMS, where the query request carries the terminal identifier; and voice switching processing is performed according to the target base station identifier and the terminal identifier if a notification message that is sent by the IMS and that indicates that the terminal has the voice switching capability is received; or a switching failure notification message is sent to the source MME if a notification message that is sent by the IMS and that indicates that the terminal does not have the voice switching capability is received. In this way, whether the terminal has a corresponding voice switching capability may be determined before a resource for performing voice switching is prepared for the terminal, and the corresponding resource is prepared for the terminal only after it is determined that the terminal has the corresponding voice switching capability, so that a resource waste can be reduced.

Embodiment 4

Figure 3:
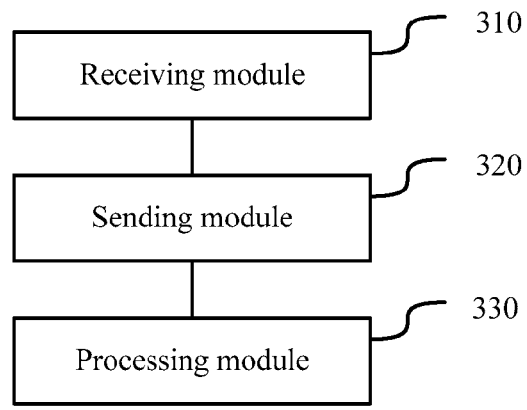
FIG. 3 is a schematic structural diagram of a voice switching apparatus according to an embodiment of the present disclosure.

Based on a same technical concept, this embodiment of the present disclosure further provides a voice switching apparatus. As shown in FIG. 3, the apparatus includes:

a receiving module 310, configured to receive a voice switching request that is sent by a source mobility management entity MME and that carries a first communications network currently used by a to-be-switched terminal, a terminal identifier of the terminal, and a target base station identifier;

a sending module 320, configured to: if the first communications network is a preset communications network, send, to an Internet Protocol multimedia subsystem IMS, a query request that is used to query whether the terminal currently has a voice switching capability from the first communications network to a locally used second communications network, where the query request carries the terminal identifier; and a processing module 330, configured to: perform voice switching processing according to the target base station identifier and the terminal identifier if a notification message that is sent by the IMS and that indicates that the terminal has the voice switching capability is received; or send a switching failure notification message to the source MME if a notification message that is sent by the IMS and that indicates that the terminal does not have the voice switching capability is received.

Optionally, the notification message that indicates that the terminal has the voice switching capability carries current-call-state information;

the processing module 330 is configured to:

if the notification message that is sent by the IMS and that indicates that the terminal has the voice switching capability is received, determine, according to the current-call-state information and a locally stored correspondence between call state information of the terminal and a voice switching capability of the terminal, whether the terminal has the voice switching capability in a current call state; and if the terminal has the voice switching capability in the current call state, perform voice switching processing according to the target base station identifier and the terminal identifier; and the sending module 320 is configured to:

send the switching failure notification message to the source MME if it is determined, according to the current-call-state information and the locally stored correspondence between call state information of the terminal and a voice switching capability of the terminal, that the terminal does not have the voice switching capability in the current call state.

Optionally, the processing module 330 is configured to:

if the notification message that is sent by the IMS and that indicates that the terminal has the voice switching capability is received, obtain resource usage of a target base station corresponding to the target base station identifier, and perform voice switching processing according to the target base station identifier and the terminal identifier if the resource usage is less than a preset resource usage threshold.

Optionally, the apparatus further includes a canceling module, configured to:

if a voice switching failure notification message sent by the IMS is received, send a resource release request to a target base station corresponding to the target base station identifier, suspend a network resource of the first communications network currently used by the terminal and a current call state of the terminal, and when a voice switching cancellation notification message sent by the source MME is received, cancel voice switching of the terminal from the first communications network to the second communications network.

Optionally, the notification message that indicates that the terminal has the voice switching capability carries current-call-state information;

the processing module 330 is configured to:

perform voice switching processing according to the target base station identifier and the terminal identifier if the notification message that is sent by the IMS and that indicates that the terminal has the voice switching capability is received and voice switching of the terminal from the first communications network to the second communications network in a call state corresponding to the current-call-state information is locally supported; and the sending module 320 is configured to:

send a voice switching failure notification message to the source MME if the voice switching of the terminal from the first communications network to the second communications network in the call state corresponding to the current-call-state information is not locally supported.

In this embodiment of the present disclosure, a voice switching request that is sent by a source mobility management entity MME and that carries a first communications network currently used by a to-be-switched terminal, a terminal identifier of the terminal, and a target base station identifier is received; if the first communications network is a preset communications network, a query request that is used to query whether the terminal currently has a voice switching capability from the first communications network to a locally used second communications network is sent to an Internet Protocol multimedia subsystem IMS, where the query request carries the terminal identifier; and voice switching processing is performed according to the target base station identifier and the terminal identifier if a notification message that is sent by the IMS and that indicates that the terminal has the voice switching capability is received; or a switching failure notification message is sent to the source MME if a notification message that is sent by the IMS and that indicates that the terminal does not have the voice switching capability is received. In this way, whether the terminal has a corresponding voice switching capability may be determined before a resource for performing voice switching is prepared for the terminal, and the corresponding resource is prepared for the terminal only after it is determined that the terminal has the corresponding voice switching capability, so that a resource waste can be reduced.

It should be noted that when the voice switching apparatus provided in the foregoing embodiment performs voice switching, division of the foregoing functional modules is used only as an example for description. In practical application, the foregoing functions may be allocated, as required, to different functional modules for implementation. That is, an internal structure of an MSC is divided into different functional modules to implement all or a part of the functions described above. In addition, the voice switching apparatus provided in the foregoing embodiment belongs to a same concept as the embodiments of the voice switching method. For a specific implementation process of the voice switching apparatus, refer to the method embodiments, and details are not described herein again.

Embodiment 5

Figure 4:
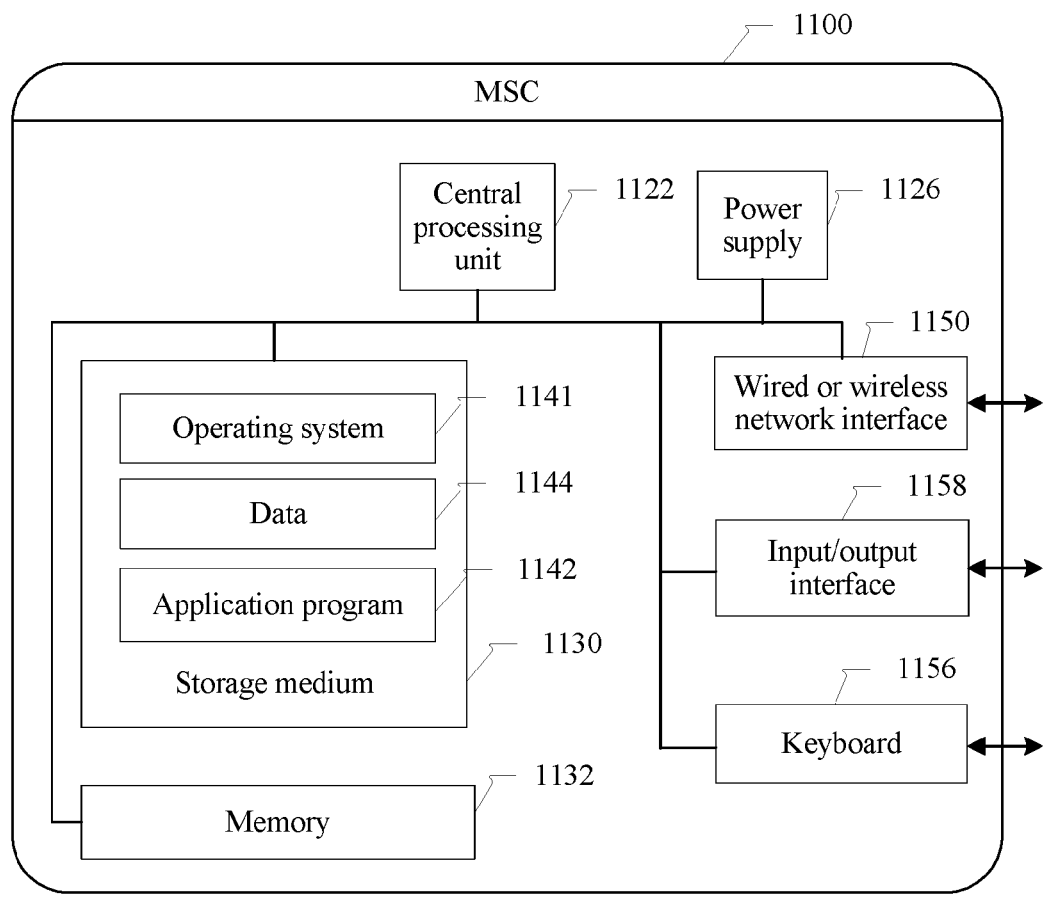
FIG. 4 is a schematic structural diagram of an MSC according to an embodiment of the present disclosure.

Referring to FIG. 4, FIG. 4 shows a schematic structural diagram of an MSC involved in this embodiment of the present disclosure. The MSC may be configured to implement the voice switching method provided in the foregoing embodiments. Specifically:

An MSC 1100 varies relatively greatly according to different configurations or performance. The MSC 1100 may include one or more than one central processing unit (CPU) 1122 (for example, one or more than one processor) and a memory 1132, and one or more than one storage medium 1130 (for example, one or more than one mass storage device) for storing an application program 1142 or data 1144. The memory 1132 and the storage medium 1130 may be a transient storage or a persistent storage. The program stored in the storage medium 1130 may include one or more than one module (not shown in the figure), and each module may include a series of instructions and operations to be performed on the MSC. Further, the central processing unit 1122 may be set to communicate with the storage medium 1130, and perform, on the MSC 1100, the series of instructions and operations in the storage medium 1130. The MSC 1100 may further include one or more than one power supply 1126, one or more than one wired or wireless network interface 1150, one or more than one input/output interface 1158, one or more than one keyboard 1156, and/or one or more than one operating system 1141, such as Windows Server™, Mac OS X™, Unix™, Linux™, or FreeBSD™. Specifically, in this embodiment, the MSC includes a memory, and one or more than one program, where the one or more than one program is stored in the memory, the one or more than one program may include one or more than one module, each module may include a series of instructions and operations to be performed on a server, and after configuration, an instruction that is included in the one or more than one program and is used to perform the following operations is implemented by one or more than one processor:

receiving a voice switching request that is sent by a source mobility management entity MME and that carries a first communications network currently used by a to-be-switched terminal, a terminal identifier of the terminal, and a target base station identifier;

if the first communications network is a preset communications network, sending, to an Internet Protocol multimedia subsystem IMS, a query request that is used to query whether the terminal currently has a voice switching capability from the first communications network to a locally used second communications network, where the query request carries the terminal identifier; and performing voice switching processing according to the target base station identifier and the terminal identifier if a notification message that is sent by the IMS and that indicates that the terminal has the voice switching capability is received; or sending a switching failure notification message to the source MME if a notification message that is sent by the IMS and that indicates that the terminal does not have the voice switching capability is received.

Optionally, the notification message that indicates that the terminal has the voice switching capability carries current-call-state information;

the performing voice switching processing according to the target base station identifier and the terminal identifier if a notification message that is sent by the IMS and that indicates that the terminal has the voice switching capability is received includes:

if the notification message that is sent by the IMS and that indicates that the terminal has the voice switching capability is received, determining, according to the current-call-state information and a locally stored correspondence between call state information of the terminal and a voice switching capability of the terminal, whether the terminal has the voice switching capability in a current call state; and if the terminal has the voice switching capability in the current call state, performing voice switching processing according to the target base station identifier and the terminal identifier; and the following operation is further included:

sending the switching failure notification message to the source MME if it is determined, according to the current-call-state information and the locally stored correspondence between call state information of the terminal and a voice switching capability of the terminal, that the terminal does not have the voice switching capability in the current call state.

Optionally, the performing voice switching processing according to the target base station identifier and the terminal identifier if a notification message that is sent by the IMS and that indicates that the terminal has the voice switching capability is received includes:

if the notification message that is sent by the IMS and that indicates that the terminal has the voice switching capability is received, obtaining resource usage of a target base station corresponding to the target base station identifier, and performing voice switching processing according to the target base station identifier and the terminal identifier if the resource usage is less than a preset resource usage threshold.

Optionally, after the performing voice switching processing according to the target base station identifier and the terminal identifier if a notification message that is sent by the IMS and that indicates that the terminal has the voice switching capability is received, the method further includes:

if a voice switching failure notification message sent by the IMS is received, sending a resource release request to a target base station corresponding to the target base station identifier, suspending a network resource of the first communications network currently used by the terminal and a current call state of the terminal, and when a voice switching cancellation notification message sent by the source MME is received, canceling voice switching of the terminal from the first communications network to the second communications network.

Optionally, the notification message that indicates that the terminal has the voice switching capability carries current-call-state information;

the performing voice switching processing according to the target base station identifier and the terminal identifier if a notification message that is sent by the IMS and that indicates that the terminal has the voice switching capability is received includes:

performing voice switching processing according to the target base station identifier and the terminal identifier if the notification message that is sent by the IMS and that indicates that the terminal has the voice switching capability is received and voice switching of the terminal from the first communications network to the second communications network in a call state corresponding to the current-call-state information is locally supported; and the following operation is further included:

sending a voice switching failure notification message to the source MME if the voice switching of the terminal from the first communications network to the second communications network in the call state corresponding to the current-call-state information is not locally supported.

In this embodiment of the present disclosure, a voice switching request that is sent by a source mobility management entity MME and that carries a first communications network currently used by a to-be-switched terminal, a terminal identifier of the terminal, and a target base station identifier is received; if the first communications network is a preset communications network, a query request that is used to query whether the terminal currently has a voice switching capability from the first communications network to a locally used second communications network is sent to an Internet Protocol multimedia subsystem IMS, where the query request carries the terminal identifier; and voice switching processing is performed according to the target base station identifier and the terminal identifier if a notification message that is sent by the IMS and that indicates that the terminal has the voice switching capability is received; or a switching failure notification message is sent to the source MME if a notification message that is sent by the IMS and that indicates that the terminal does not have the voice switching capability is received. In this way, whether the terminal has a corresponding voice switching capability may be determined before a resource for performing voice switching is prepared for the terminal, and the corresponding resource is prepared for the terminal only after it is determined that the terminal has the corresponding voice switching capability, so that a resource waste can be reduced.

Persons of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A voice switching method, comprising:
    sending, by a mobility management entity (MME), a voice switching request of a terminal from a first communication network to a second communication network to a mobile switch center (MSC) server, the voice switching request carries a terminal identifier of the terminal and a target base station identifier;
    receiving, by the MSC server, the voice switching request that is sent by the MME;
    sending, by the MSC server to an Internet Protocol multimedia subsystem (IMS), a query request that is used to query whether the terminal is able to switch from the first communications network to the second communications network in a current call state of the terminal, wherein the query request carries the terminal identifier; and
    receiving, by the MSC server, a notification message from the IMS, the notification message indicating whether the terminal is able to switch from the first communication network to the second communication network in the current call state of the terminal; and
    performing, by the MSC server, voice switching processing according to the target base station identifier and the terminal identifier in response to determining that the notification message received from the IMS indicates that the terminal is able to switch from the first communication network to the second communication network in the current call state of the terminal, or sending, by the MSC server, a switching failure notification message to the MME in response to determining that the notification message received from the IMS indicates that the terminal is not able to switch from the first communication network to the second communication network in the current call state of the terminal.

2. The method according to claim 1,
    wherein the notification message indicates whether the terminal has a voice switching capability and carries current-call-state information of the terminal.

3. The method according to claim 1, wherein the performing voice switching processing according to the target base station identifier and the terminal identifier comprises:
    obtaining resource usage of a target base station corresponding to the target base station identifier, and performing voice switching processing according to the target base station identifier and the terminal identifier if the resource usage is less than a preset resource usage threshold.

4. The method according to claim 1, wherein the method further comprises:
    receiving a voice switching failure notification message from the IMS;
    sending a resource release request to a target base station corresponding to the target base station identifier;
    suspending a network resource of the first communications network and the current call state of the terminal; and
    in response to receiving a voice switching cancellation notification message from the MME, canceling voice switching of the terminal from the first communications network to the second communications network.

5. The method according to claim 1,
    wherein the notification message indicates that the terminal has a voice switching capability and carries current-call-state information of the terminal;
    wherein the performing voice switching processing according to the target base station identifier and the terminal identifier comprises:
        performing voice switching processing according to the target base station identifier and the terminal identifier if voice switching of the terminal from the first communications network to the second communications network in a call state corresponding to the current-call-state information is locally supported; and
    wherein the method further comprises:
        sending a voice switching failure notification message to the MME if the voice switching of the terminal from the first communications network to the second communications network in the call state corresponding to the current-call-state information is not locally supported.

6. The method according to claim 1,
    wherein the notification message indicates whether the IMS has a voice switching capability and carries current-call-state information of the terminal.

7. The method according to claim 1, wherein the MME receives a handover request from a base station of the terminal.

8. The method according to claim 2,
    wherein the voice switching capability includes voice switching before ringing, voice switching during ringing, or voice switching of a multi-channel call.

9. The method according to claim 7, further comprising:
    sending, by the MME, the switching failure notification message to the base station of the terminal.

10. The method according to claim 8,
    wherein the voice switching capability includes voice switching before ringing, voice switching during ringing, or voice switching of a multi-channel call.

11. A voice switching apparatus, comprising:
    a processor;
    a receiver, configured to receive, from a mobility management entity (MME), a voice switching request of a terminal to switch from a first communication network to a second communication network, wherein the voice switching request carries a terminal identifier of the terminal and a target base station identifier; and
    a transmitter, configured to send, to an Internet Protocol multimedia subsystem (IMS), a query request that is used to query whether the terminal is able to switch from the first communications network to the second communications network in a current call state of the terminal, wherein the query request carries the terminal identifier;
    wherein the receiver is further configured to receive a notification message from the IMS, the notification message indicating whether the terminal is able to switch from the first communication network to the second communication network in the current call state of the terminal; and the processor is further configured to:
- perform voice switching processing according to the target base station identifier and the terminal identifier in response to determining that the notification message received from the IMS indicates that the terminal is able to switch from the first communication network to the second communication network; or
- send a switching failure notification message to the MME in response to determining that the notification message received from the IMS indicates that the terminal is not able to switch from the first communication network to the second communication network.

12. The apparatus according to claim 11, wherein the notification message indicates whether the terminal has a voice switching capability and carries current-call-state information of the terminal.

13. The apparatus according to claim 11, wherein the processor is further configured to:
obtain resource usage of a target base station corresponding to the target base station identifier, and perform voice switching processing according to the target base station identifier and the terminal identifier if the resource usage is less than a preset resource usage threshold.

14. The apparatus according to claim 11, wherein the processor is further configured t:
- in response to a voice switching failure notification message received from the IMS, cause the transmitter to send a resource release request to a target base station corresponding to the target base station identifier,
- suspend a network resource of the first communications network and the current call state of the terminal, and
- in response to a voice switching cancellation notification message received from the MME, cancel voice switching of the terminal from the first communications network to the second communications network.

15. The apparatus according to claim 11, wherein the notification message indicates that the terminal has a voice switching capability and carries current-call-state information of the terminal;
wherein the processor is further configured to:
- perform voice switching processing according to the target base station identifier and the terminal identifier if voice switching of the terminal from the first communications network to the second communications network in a call state corresponding to the current-call-state information is locally supported; and
wherein the transmitter is further configured to:
- send a voice switching failure notification message to the MME if the voice switching of the terminal from the first communications network to the second communications network in the call state corresponding to the current-call-state information is not locally supported.

16. A communication system, comprising:
a mobility management entity (MME); and
a mobile switch center (MSC) server;
wherein the MME is configured to send a voice switching request of a terminal from a first communication network to a second communication network to the MSC server, wherein the voice switching request carries a terminal identifier of the terminal and a target base station identifier; and
wherein the MSC server is configured to:
- receive the voice switching request that is sent by the MME;
- send, to an Internet Protocol multimedia subsystem (IMS), a query request that is used to query whether the terminal is able to switch from the first communications network to the second communications network in a current call state of the terminal, wherein the query request carries the terminal identifier;
- receive a notification message that is sent by the IMS, the notification message indicating whether the terminal is able to switch from the first communication network to the second communication network in the current call state of the terminal; and
- perform voice switching processing according to the target base station identifier and the terminal identifier in response to determining that the notification message sent by the IMS indicates that the terminal is able to switch from the first communication network to the second communication network, or send a switching failure notification message to the MME in response to determining that the notification message sent by the IMS indicates that the terminal is not able to switch from the first communication network to the second communication network.

17. The communication system according to claim 16, wherein the notification message indicates whether the IMS has a voice switching capability and carries current-call-state information of the terminal.

18. The communication system according to claim 16, wherein the notification message indicates whether the terminal has a voice switching capability and carries current-call-state information of the terminal.

19. The communication system according to claim 16, wherein the voice switching capability includes voice switching before ringing, voice switching during ringing, or voice switching of a multi-channel call.

20. The communication system according to claim 16, wherein the MME is further configured to send the switching failure notification message to a base station of the terminal.

* * * * *